United States Patent
Sirai (10) Patent No.: US 10,664,841 B2
(45) Date of Patent: May 26, 2020

(54) METHOD FOR DETECTING A RISK OF REPLACEMENT OF A TERMINAL, CORRESPONDING DEVICE, PROGRAM AND RECORDING MEDIUM

(71) Applicant: INGENICO GROUP, Paris (FR)

(72) Inventor: Youssef Sirai, Brie-Comte-Robert (FR)

(73) Assignee: INGENICO GROUP, Paris (FR)

( * ) Notice: Subject to any disclaimer, the term of this patent is extended or adjusted under 35 U.S.C. 154(b) by 513 days.

(21) Appl. No.: 14/947,849

(22) Filed: Nov. 20, 2015

(65) Prior Publication Data

US 2016/0148213 A1    May 26, 2016

(30) Foreign Application Priority Data

Nov. 21, 2014    (FR) .................................... 14 61282

(51) Int. Cl.

| | |
|---|---|
| *G06Q 40/00* | (2012.01) |
| *G06Q 20/40* | (2012.01) |
| *G06Q 20/20* | (2012.01) |
| *G07F 19/00* | (2006.01) |
| *G06Q 20/32* | (2012.01) |
| *G06Q 20/38* | (2012.01) |
| *G07G 3/00* | (2006.01) |

(52) U.S. Cl.
CPC .......... *G06Q 20/4016* (2013.01); *G06Q 20/20* (2013.01); *G06Q 20/3224* (2013.01); *G06Q 20/382* (2013.01); *G07F 19/209* (2013.01); *G07G 3/006* (2013.01)

(58) Field of Classification Search
CPC ............... G06Q 20/20; G06Q 20/3224; G06Q 20/4016; G06Q 20/382; G07G 3/006

USPC ................................................ 705/35–40, 44
See application file for complete search history.

(56) References Cited

U.S. PATENT DOCUMENTS

| | | | |
|---|---|---|---|
| 6,694,436 B1 * | 2/2004 | Audebert ............... | G06Q 20/04 707/999.202 |
| 7,630,924 B1 | 12/2009 | Collins et al. | |
| 7,668,750 B2 * | 2/2010 | Bonalle .................. | G06Q 20/00 235/380 |
| 8,554,631 B1 | 10/2013 | Barton et al. | |
| 9,626,679 B2 * | 4/2017 | Bhorania ........... | G06Q 20/4016 |

(Continued)

FOREIGN PATENT DOCUMENTS

| | | | |
|---|---|---|---|
| EP | 2605204 A2 * | 6/2013 | |
| FR | 1458749 A | 3/1966 | |

(Continued)

OTHER PUBLICATIONS

Sullivan: "The Changing Nature of U.S. Card Payment Fraud: Industry and Public Policy Options", Economic Review—Federal Reserve Bank of Kansas City; Kansas City vol. 95, Iss. 2 (Year: 2010).*

(Continued)

*Primary Examiner* — Edward J Baird
(74) *Attorney, Agent, or Firm* — David D. Brush; Westman, Champlin & Koehler, P.A.

(57) ABSTRACT

A method is provided for detecting a risk of replacement of an authentic electronic payment terminal by a fraudulent electronic payment terminal. The method includes generating an alert when the value of at least one operating characteristic associated with the authentic electronic payment terminal is below at least one predetermined threshold.

8 Claims, 2 Drawing Sheets

(56) References Cited

U.S. PATENT DOCUMENTS

| | | |
|---|---|---|
| 2004/0178260 A1 | 9/2004 | Scarafile et al. |
| 2005/0185779 A1* | 8/2005 | Toms ................... G10L 17/22 379/114.14 |
| 2006/0186191 A1* | 8/2006 | Mitchell ............. G06Q 20/042 235/379 |
| 2007/0174472 A1* | 7/2007 | Kulakowski ........... G06F 21/31 709/229 |
| 2010/0121701 A1* | 5/2010 | Nguyen ................ G06Q 20/20 705/14.38 |
| 2010/0169192 A1* | 7/2010 | Zoldi ................... G06Q 40/00 705/30 |
| 2010/0274691 A1* | 10/2010 | Hammad ........... G06Q 20/3221 705/30 |
| 2011/0078034 A1* | 3/2011 | Hayhow ................ G06Q 20/20 705/21 |
| 2011/0258118 A1* | 10/2011 | Ciurea .................. G06Q 40/00 705/44 |
| 2011/0258121 A1* | 10/2011 | Kauniskangas ........ G06Q 20/20 705/67 |
| 2012/0254027 A1* | 10/2012 | Kanngard ............. G06Q 20/20 705/41 |
| 2014/0006190 A1* | 1/2014 | Loomis, III ........... G06Q 20/20 705/18 |
| 2014/0121830 A1* | 5/2014 | Gromley .............. G07F 19/209 700/236 |
| 2015/0120560 A1* | 4/2015 | Fisher ................ G06Q 20/4014 705/44 |
| 2016/0125529 A1* | 5/2016 | Acharya .............. G06Q 40/025 705/38 |
| 2017/0255939 A1* | 9/2017 | Quentin ................ G06Q 20/20 |

FOREIGN PATENT DOCUMENTS

| | | |
|---|---|---|
| FR | 3025912 A | 3/2016 |
| GB | 2338329 A | 12/1999 |

OTHER PUBLICATIONS

Sullivan: "The Changing Nature of U.S. Card Payment Fraud: Industry and Public Policy Options", Economic Review—Federal Reserve Bank of Kansas City; Kansas City vol. 95, Iss. 2, (Second Quarter 2010). (Year: 2010).*

Naccache et al (Demande De Brevet D'Invention, N° de publication: 3 025 912) "Procede De Detection D'Un Risque De Substitution D'Un Terminal, Dispositif, Programme Et Support D'Enregistrement Correspondants" (STIC translation from French to English) (Year: 2014).*

English Translation of the Written Opinion dated Jun. 5, 2015 for French Application No. 1461282, filed Nov. 21, 2014.

French Search Report and Written Opinion dated Jun. 5, 2015 for French Application No. 1461282, filed Nov. 21, 2014.

Machine translation of the European Official Action dated Sep. 6, 2018 for corresponding EP Application No. 5189942.4.

European Official Action dated Sep. 6, 2018 for corresponding EP Application No. 15189942.4.

Machine translation of the European Official Action dated Feb. 14, 2020 for corresponding EP Application No. 5189942.4.

* cited by examiner

METHOD FOR DETECTING A RISK OF REPLACEMENT OF A TERMINAL, CORRESPONDING DEVICE, PROGRAM AND RECORDING MEDIUM

1. CROSS-REFERENCE TO RELATED APPLICATIONS

This Application claims priority from French Patent Application FR 1461282 filed Nov. 21, 2014, the content of which is incorporated herein by reference in its entirety.

2. FIELD OF THE DISCLOSURE

The disclosure relates to the field of payment terminals. The technique relates more particularly to the securing of payment terminals.

3. PRIOR ART

Payment terminals are subjected to numerous attempts at attack. Indeed, owing the nature of the information that it contains and the sensitivity of the data that it processes, the payment terminal is an object highly valued by malicious individuals.

A certain type of fraud is becoming increasingly widespread: in this type of fraud, an authentic/valid payment terminal is replaced by a fraudulent/counterfeit payment terminal. The authentic payment terminal is purloined in a business establishment and immediately replaced by a payment terminal that has an appearance of validity but has actually having been modified, for example to read and copy the data from a customer's bank cards so as to be able carry out fraudulent transactions with the customer's data that has been read. The unwary merchant can easily be duped, and it can be several days before he realizes that his payment terminal has been replaced.

One way to resolve this problem of replacement is to apply a tag to the terminal by which the merchant can realize that his terminal has been replaced. This technique is efficient provided that the fraudulent individual is not himself capable of reproducing this tag. This technique is therefore limited by the fraudulent individual's capacity to reproduce the tag. Now, for a tag to be efficient, it must be visible. If this tag is visible it is also visible to the fraudulent individual who can therefore easily reproduce it. Thus, this simple solution for applying a tag is actually not efficient.

Another way to resolve this problem is to have only a wired payment terminal, i.e. a payment terminal that is physically connected to a cash register for example. This solution is of course efficient but actually unsuited to the current practice in which merchant and their customers are offered high mobility. However, this technique is used for example in big stores and in certain types of shops.

The existing techniques are nevertheless limited when it is sought to forestall or prevent fraud in smaller business establishments. There is therefore a need to provide a technique that enables the merchant to detect fraud through replacement of a terminal and makes it possible to prevent the negative effects of such fraud.

4. SUMMARY

An exemplary embodiment of the present application relates to a method for detecting a risk of replacement of an authentic electronic payment terminal by a fraudulent electronic payment terminal, comprising a step for generating an alert when the value of at least one operating characteristic (CFi) associated with the authentic electronic payment terminal is below at least one predetermined threshold (Si).

Thus, an exemplary embodiment proposes a novel and inventive solution to combat the practice of replacing electronic payment terminals, making it possible to speedily know whether a given authentic electronic payment terminal has been replaced by a fraudulent electronic payment terminal, by detecting the fact that an operating characteristic of this electronic payment terminal is suspect because its operation is below an "expected" threshold for this operating characteristic.

Indeed, certain operating characteristics of an electronic payment terminal such as for example an average number of transactions made over a given time period, or again a totalized amount (or sum of money) corresponding to the transactions made in a given time period, enables the detection of a use not compliant with what is conventionally observed for this very same type of electronic payment terminal.

In this case, if one or more operating characteristics of a given electronic payment terminal is (or are) considered to be suspect, an alert is generated so as to provide information about a possible attempt at fraud on the electronic payment terminal in question.

According to one particular aspect of the present disclosure, the method comprises the following steps:
  obtaining at least one piece of information from the authentic electronic payment terminal making it possible to determine at least one operating characteristic (CFi) associated with the authentic electronic payment terminal;
  comparing the preliminarily determined operating characteristic (CFi) with the predetermined threshold (Si).

Thus, according to this embodiment of the disclosure, several pieces of information are collected, coming from the electronic payment terminal, to determine an operating characteristic enabling the generation or non-generation of an alert as a function of its comparison with a predetermined threshold.

Indeed, according to the different embodiments of the disclosure, the generation of an alert depends on the observation, over a given time period, of certain parameters of the electronic payment terminal and not of a state of operation of the electronic payment terminal at a given point in time.

For example, the operating characteristic (CFi) associated with the authentic electronic payment terminal belongs to the group comprising:
  a number of transactions during a predetermined time period;
  a totalized amount corresponding to the transactions made during a predetermined time period;
  a combination of the above characteristics.

Thus, for example, one operating characteristic that can be used to detect an attempt at fraud on an electronic payment terminal corresponds to a number of transactions made by the electronic payment terminal over a given time period. Indeed, it is possible to set up statistics, or metrics, of use of an electronic payment terminal by observing the number of transactions made over a sufficiently lengthy period and the time of day or week or month when these transactions are made in order to determine a threshold below which any suspect operation by the electronic payment terminal can be detected. In particular, when an authentic electronic payment terminal is replaced by a fraudulent electronic payment terminal, the authentic electronic payment terminal no longer carries out any transactions and, over a given period, the number of transactions associated with this electronic payment terminal can be below the predetermined threshold and can cause an alert on be generated.

In this case, at each transaction made by the terminal, a piece of information corresponding to the transaction is obtained and enables the incrementing of a current number of transactions. At the end of a determined time period, the current number of transactions made is then compared with the predetermined corresponding threshold, i.e. the minimum number of transactions expected for the given period.

In another example, one operating characteristic that can be used to detect (an attempt at) fraud on an electronic payment terminal corresponds to a totalized amount (or sum of money) corresponding to the transactions made by the electronic payment terminal over a given time period. Indeed, in the same way as the statistics for an average number of transactions made by an electronic payment terminal can be established, statistics can also be established for a totalized amount corresponding to the transactions made over a given period and can serve as a means to detect a risk of (an attempt at) fraud. In particular when an authentic electronic payment terminal is replaced by a fraudulent electronic payment terminal, the authentic electronic payment terminal no longer carries males any transactions and, over a given period, the totalized amount corresponding to the transactions associated with this electronic payment terminal can be below the predetermined threshold and can give rise to the generation of an alert.

In this case, at each transaction made by the terminal, a piece of information corresponding to the amount of the transaction is obtained and enables a totalized current amount (i.e. the transactional amount of money) corresponding to the transactions made to be incremented. At the end of the determined time period, the totalized current amount of the transactions made is then compared with the predetermined corresponding threshold, i.e. the minimum totalized amount corresponding to transactions that is expected for the given period.

Naturally, these two operating characteristics can be combined to detect (an attempt at) fraud and to generate an alert for example only when the two characteristics observed are simultaneously below their respectively thresholds. Such a combination restricts untimely alerts related to exceptional conditions of use of the electronic payment terminal which can influence one operating characteristic or another without there being any replacement of a terminal.

Besides, the operating characteristic or characteristics used need to be observed over a given time period representing normal, or rated, operation of the electronic payment terminal.

Thus, the thresholds are determined over given time periods, defined as being the most representative of this rated operation of the electronic payment terminal and the alerts are triggered only when the operating characteristics are deemed to be suspect over such a time period.

For example, such a time period corresponds to an entire working day for an electronic payment terminal situated at a sales point. In another example, such a time period corresponds to a time slot of a few hours that are significant in the use of the terminal, for example midday to 2 pm for a restaurant.

According to one particular embodiment of the disclosure, the step for generating an alert takes account of at least one piece of data provided by at least one user of the authentic electronic payment terminal.

Thus, according to this embodiment, the generation of an alert takes account of data provided by a user of the electronic payment terminal, for example the merchant.

For example, such a piece of data provided by the merchant can make it possible to determine the different thresholds corresponding to the different operating characteristics potentially used to generate an alert and can play a role in the determining proper of this operating characteristic or characteristics.

Thus, the merchant can so to speak parameterize the generation of alerts, for example especially when his use of the terminal changes, for whatever reason.

For example, the piece of data is provided by the user via at least one user interface.

Thus, according to this embodiment, the user of the electronic payment terminal, for example the merchant, can configure/parameterize the generation of alerts via a user interface enabling it to modify certain pieces of data speedily and ergonomically. The interface can for example be a web interface by which the changes made by the user can be taken instantaneously into account.

According to one particular aspect of the disclosure, the piece of data provided by the user belongs to the group comprising:
  at least one time period;
  a minimum number of transactions made in relation with at least one time period;
  a totalized minimum amount corresponding to the transactions made in relation with at least one time period;
  a combination of the above data.

Thus, according to this embodiment of the disclosure, the user of the electronic payment terminal can enter one or more time slots in a day or a week thus making it possible to define periods of time specifically related to the use of the terminal.

For example, the merchant enters his opening times (depending on the day of the week for example to take account of particular timings) as well as the periods of "offline" transactions, i.e. periods when the transactions made in a day are effectively transmitted to the banking institution in charge of their processing.

The merchant can also indicate his closing days whether planned or exceptional, so as to avoid untimely alerts due to changes in the use of the terminal.

The merchant can also himself enter data on the minimum number of transactions expected over a predefined time slot, thus making it possible to set the threshold below which an alert can be generated.

The merchant can also provide the minimum totalized amount corresponding to the transactions expected on a predefined time slot, thus making it possible to set the threshold below which an alert can be generated.

Naturally, the merchant can provide one or more of these pieces of data when he possesses them in order to parameterize the generation of an alert more or less precisely.

According to one particular characteristic of the disclosure, the method furthermore comprises a step for sending out a generated alert addressed to at least one entity preliminarily associated with at least one user of the authentic electronic payment terminal.

Thus, according to this embodiment of the disclosure, the generated alert is transmitted to an entity preliminarily associated with a user of the electronic payment terminal, for example the merchant. It can be the merchant's mobile terminal towards which an alert can be sent in the form of an SMS or email message or again it can be a landline telephone to which an alert can be sent from an automatic voice messaging system.

According to one particular aspect of the disclosure, the operating characteristic is associated with the authentic electronic payment terminal via a single identifier of the authentic electronic payment terminal.

Thus, according to this embodiment of the disclosure, the authentic electronic payment terminal is identified uniquely to enable its association with an operating characteristic of its own so as to secure the generation of alerts.

For example, the information obtained from the electronic payment terminal to determine the operating characteristic or characteristics carries the unique identifier of the corresponding electronic payment terminal so as to enable the association of the operating characteristic with the given electronic payment terminal.

For example, this unique identifier is formed by at least two pieces of information that can be used to identify the terminal, such as for example the (numTPV, numComm) pair where numTPV is a serial number of the electronic payment terminal and numComm is a merchant's number enabling the terminal to be identified uniquely.

Thus, each piece of transaction information obtained for an electronic payment terminal is associated with the unique identifier of the electronic payment terminal so that the operating characteristic determined from transaction information is associated with this electronic payment terminal.

In this way, when several electronic payment terminals benefit from the method of detection of a risk of replacement according to the different embodiments of the disclosure, each of them is generated independently by means of its identifier.

According to one particular embodiment of the disclosure, the method is implemented by a remote entity.

Thus, according to this embodiment of the disclosure, the method for detecting a risk of replacement is implemented by a remote entity corresponding for example to a server of at least one managing institution for managing said authentic electronic payment terminal for said merchant, i.e. capable of receiving transactional information from the electronic payment terminal.

In particular, this remote server is capable of obtaining transactional information for each transaction made by an electronic payment terminal, including the amount corresponding to the transaction. It can therefore then determine one or more operating characteristics of an electronic payment terminal, for example by incrementing the current number of transactions at each transaction made or by incrementing the totalized current amount corresponding to the transactions at each transaction made.

For example, the remote server corresponds to the server of the merchant's banking institution or else to the server of a remote entity in charge solely of the management of the security and the tracking of the activity of a plurality of electronic payment terminals.

This remote entity can also correspond to a central computer of the sales point at which the authentic electronic payment terminal is used.

According to one particular aspect of the disclosure, prior to the step for generating an alert, the method comprises a step for comparing the operating characteristic (CFi) associated with the authentic electronic payment terminal with an operating characteristic that is geographically associated with the sales point to which the authentic electronic payment terminal is attached.

Thus, according to this embodiment of the disclosure, before generating an alert, a cross check is made with another technique for detecting a risk of replacement of an authentic electronic payment terminal by a fraudulent electronic payment terminal based on a geographical association of a transaction with a given sales point. This technique is described especially in the French patent application FR1458749 by the present Applicant and consists of the detection of an excessively large number of transactions made at a given sales point.

For example, when the method of detection of the present disclosure enables the detection of a number of transactions made by an authentic electronic payment terminal that is below the predetermined threshold for a given period, then, if the number of transactions geographically associated with the sales point to which the electronic payment terminal in question is normally attached is itself far above the same threshold, the existence of fraud can be validated. Indeed, in this case, the authentic electronic payment terminal is no longer being used whereas a fraudulent electronic payment terminal is being used at the given sales point.

This cross checking of two detections based on two distinct detection criteria minimizes "false" alerts and therefore limits inconvenience to the merchant caused by an operation that is exceptionally different from normal operation but not due to fraud.

According to another aspect, the disclosure relates to a device for detecting a risk of replacement of an authentic electronic payment terminal by a fraudulent electronic payment terminal comprising means for generating an alert when at least one operating characteristic (CFi) associated with the authentic electronic payment terminal is below at least one predetermined threshold (Si). Such a device is for example a remote server or again an entity of a sales point.

The disclosure also pertains to a computer program downloadable from a communications network and/or stored in a computer readable medium and/or executable by a microprocessor, comprising program code instructions to execute the steps of the method for detecting a risk of replacement as described here above, when the program is executed by a computer.

Finally, the disclosure also relates to a computer-readable recording medium on which there is recorded a computer program comprising a set of instructions executable by a computer or a processor to implement the method of detection of a risk of replacement as described here above.

5. FIGURES

Other features and advantages of the present disclosure shall appear more clearly from the following description of a preferred embodiment given by way of a simple illustratory and non-exhaustive example and from the appended drawings, of which.

6. DESCRIPTION 6.1. General Principle

Figure 1:
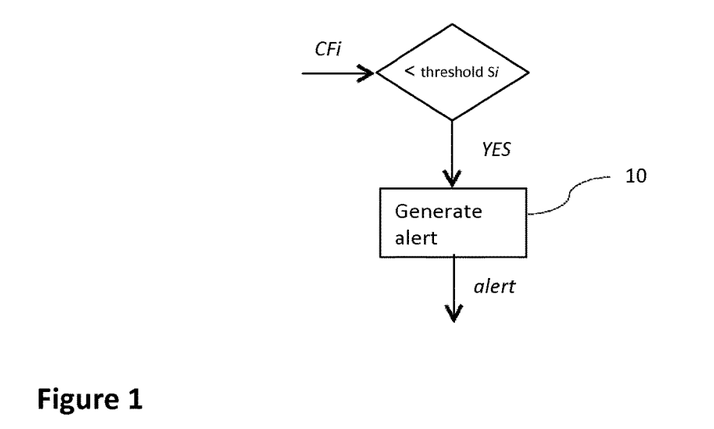
FIG. 1 presents a block diagram of the proposed technique according to one particular embodiment.

The general principle of the disclosure, described with reference to FIGS. 1 and 2, consists in detecting the fact that an operating characteristic CFi is suspect for a given authentic electronic payment terminal, in order to generate an alert on the risk of replacement of the given electronic payment terminal by a fraudulent electronic payment terminal.

For example, the operating characteristic (CFi, $CF_j$ . . . ) corresponds to a number of transactions or to a totalized amount corresponding to transactions expected, for a given time slot, for a given electronic payment terminal, and is considered to be suspect when it does not correspond to the expected values (for example when it is below a predetermined threshold Si).

This situation can especially occur when this authentic electronic payment terminal has been replaced by a fraudulent electronic payment terminal. Indeed, in the case of the replacement of the authentic electronic payment terminal by a fraudulent electronic payment terminal, for example at a sales point or a restaurant, the authentic electronic payment terminal will no longer carry out any transactions because it is the fraudulent electronic payment terminal that is being used.

Thus, if it is detected that the number of transactions (CFi) associated with an electronic payment terminal is below a predetermined threshold denoted as Si, over a given time period, this can be the consequence of a replacement of the electronic payment terminal by a fraudulent electronic payment terminal.

Similarly, if the totalized amounts corresponding to the transactions (CFj) associated with an electronic payment terminal are below a predetermined threshold Sj, over a given period of time, this can also be due to a replacement of the electronic payment terminal by a fraudulent electronic payment terminal.

In these different situations, the method of detection according to the different embodiments of the disclosure implements a step 10 for generating an alert on the risk of replacement of the authentic electronic payment terminal by a fraudulent electronic payment terminal.

To this end, the operating characteristic used to detect a possible fraud by replacement of a terminal can be monitored for a given time period, for example by an entity authorized to analyze certain pieces of data (such as for example each transaction made as well as the amount corresponding to each transaction made) coming from the electronic payment terminal.

Figure 2:
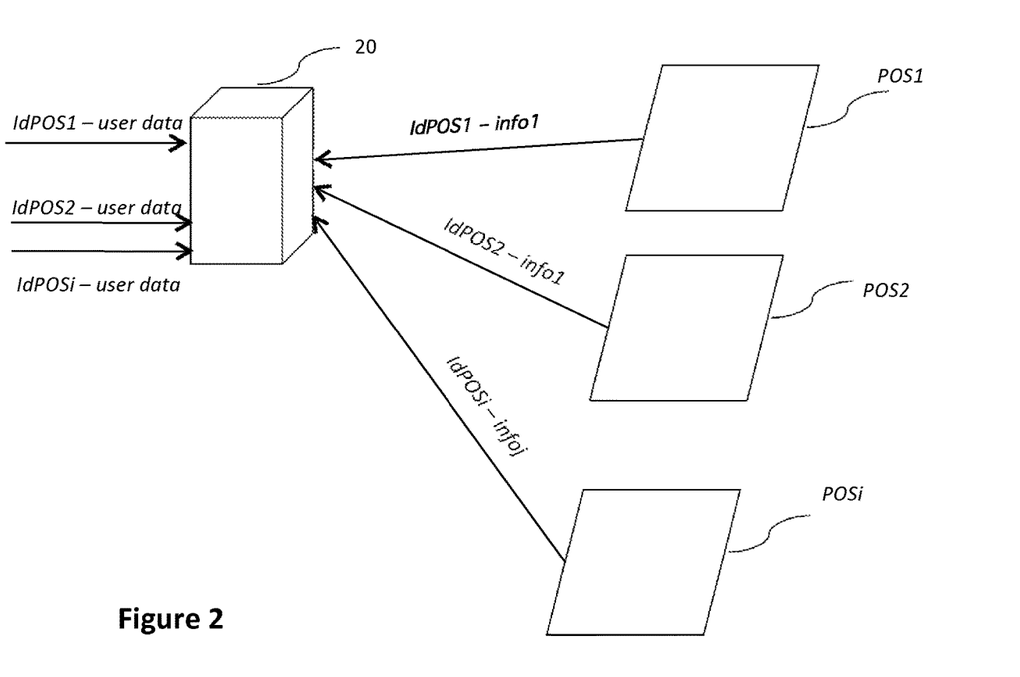
FIG. 2 presents a system in which the proposed technique can be implemented according to one particular embodiment.

For example, this entity corresponds to a remote server 20 as illustrated in FIG. 2, capable of receiving information about a plurality of electronic payment terminals POS1, POS2 . . . POSi.

This remote server 20 can correspond to a server of a banking institution in charge of the management of the transactions of the plurality of the electronic payment terminals, or again a remote server in charge of the management of the security of this plurality of electronic payment terminals, by identifying fraud and tracking the activity of the electronic payment terminals.

This entity 20 can also correspond to an entity situated at the same place as the authentic electronic payment terminal, such as for example a merchant's main computer.

Besides, and as illustrated in FIG. 2, the pieces of data received from each electronic payment terminal, for which the entity 20 is in charge, are identified solely by a unique identifier of the electronic payment terminal. Thus, the entity 20 can carry out the method for detecting a risk of replacement in parallel for a plurality of electronic payment terminals in making sure that each determined operating characteristic is associated uniquely with one particular electronic payment terminal.

Thus, the user data provided for example by the merchant using the authentic electronic payment terminal is associated with the identifier of the electronic payment terminal (IdPOS1, IdPOS2 . . . IdPOSi), along with the information coming from the electronic payment terminals (IdPOS1-info1, IdPOS2-info1 . . . IdPOSi-infoj).

This unique identifier of an electronic payment terminal corresponds to a serial number or is formed by at least two pieces of information enabling the terminal to be identified, such as for example the pair (numTPV, numComm) where numTPV is a serial number of the electronic payment terminal and numComm is the merchant's number enabling him to be identified uniquely.

We shall now provide a more detailed description of two embodiments of the disclosure, with reference to FIG. 2, where the entity 20 corresponds to a remote server.

6.2. Description of a First Embodiment

In a first embodiment, it is assumed that the operating characteristic of the electronic payment terminal used to detect fraud, if any, by replacement of a terminal corresponds to the number of transactions made over a given time period.

6.2.1 Operating Characteristic

For example, this operating characteristic is denoted as CF1, and is determined through information info1 transmitted by the electronic payment terminal to the server 20.

This is for example the case with electronic payment terminals POS1 and POS2, as illustrated in FIG. 2.

Thus, at each transaction made by the electronic payment terminal POS1, the server 20 obtains a piece of information info1 corresponding to this transaction. This piece of information info1 enables especially the server 20 to increment the current number of transactions already made by the electronic payment terminal POS1, during the current time period.

6.2.2 Time Period

It is considered for example that this time period extends from the opening time of the business to which the electronic payment terminal POS1 is attached up to the time when offline transactions, if any, are ended. Indeed, offline transactions of this type are taken into consideration not when they are implemented but only when a communication with the server in charge of the processing of the transactions is initiated, most often outside the opening times of the business.

This time period can be directly provided by the merchant to the server 20 in the form of user data associated with a unique identifier of the given electronic payment terminal (IdPOSi–user data=time slot) or computed by the server 20 from one or more pieces of user data associated with a unique identifier of the given electronic payment terminal (IdPOSi–user data=opening times, opening days, etc.).

Thus, the time period used to implement the method for detecting a risk of fraud can be determined in various ways, according to the data given by the user/merchant.

6.2.3 Comparison with the Threshold

Once the given time period has elapsed, the server can determine the final value of the operating characteristic CF1 used, in this case the number of transactions made, in order to compare it with a predetermined threshold, denoted for example as S1 which can also form part of the user data given to the server 20.

For example, this threshold S1 has been furnished (Id-POS1-user data) to the server by the merchant using the electronic payment terminal POS1 to be monitored, for example via a user interface for parameterizing the method for detecting a risk of fraud.

According to another example, this threshold S1 corresponds to a threshold S'1 given by the merchant, subsequently enhanced by data not provided by the merchant, such as for example weighting operations to take account of criteria not controlled by the merchant.

Thus, it can happen that the merchant has computed a threshold S'1 from statistics on the activity of his business but without taking account of special random factors which enable false alerts to be limited to the maximum. Such weighting operations correspond for example to the application of a margin of error which is variable according to the threshold value S'1 given by the merchant.

For example, when the number of transactions ranges from x to y, then the weighting to be applied corresponds to xy %, whereas when the number of transactions ranges from y to z, the weighting to be applied corresponds to yz %.

These weightings can also take account of a variable risk of attempted fraud such as for example a relatively low risk in a small-sized business where only one electronic payment terminal is used and a relatively high risk in a large-sized business where several electronic payment terminals are used.

These weighting operations can therefore also take account of the number of terminals used in a same business or sales point in order to take account of random factors due to the possibility of one particular electronic payment terminal being used by chance from among the plurality of electronic payment terminals. What has to be done therefore is to "smooth" the number of transactions over the plurality of electronic payment terminals while at the same time possibly taking account of specific features proper to each electronic payment terminal (the employee in charge of its use, his position in the sales point, etc.).

The server 20 can be in charge of applying these weighting operations and of updating them regularly (for example by pooling the experiences of implementation of the method of detection according to the different embodiments of the disclosure).

Finally, the server compares the operating characteristics CF1 with the predetermined threshold S1 in order to generate or not generate an alert.

Thus, according to this first embodiment, if the number of transactions made on the given time period is below the threshold S1, then an alert on a risk of replacement of the terminal is generated. If not, the method is reactivated (the number of transactions is reset) for the next reference time period, and so on and so forth.

6.2.4 Alert

If an alert is generated, it can be used in different ways, according to different modes of implementation of this embodiment of the disclosure. Indeed, the mode of sending out the alert can be configured so as to be adapted as efficiently as possible to the merchant's needs or to the needs of the user of the electronic payment terminal.

For example, one or more of the merchant's communications terminals will have been pre-recorded in a database of the server 20 as recipients of an alert. This can be a mobile terminal number (a smartphone, tablet, PDA, etc.) to which an SMS message or an email message can be sent. It can also be a landline terminal number to which a call can be sent by an operator or a voice messaging service.

The merchant, on receiving the alert, can then check to see whether the authentic electronic payment terminal has truly been replaced by a fraudulent electronic payment terminal, for example by verifying the serial number of the electronic payment terminal being used. If this verification is not possible or is not reliable (because the fraudulent electronic payment terminal reproduces the serial number of the authentic electronic payment terminal), then the merchant can call on the entity managing the electronic payment terminal to make more precise verifications while stopping the use of the electronic payment terminal suspected of being fraudulent.

6.3. Description of a Second Embodiment

In this second embodiment, the operating characteristic of the electronic payment terminal used to detect any fraud by replacement of a terminal is considered to correspond to the totalized amount corresponding to the transactions made over a given time period.

The different steps implemented in this second embodiment are identical to those described here above with reference to the first embodiment, and are not described in detail here again.

Thus, determining the threshold to be applied, determining the time period to be taken into account and generating and sending out of an alert are identical.

Only the operating characteristic of the electronic payment terminal used is different and no longer corresponds to a number of transactions but to a totalized amount corresponding to the transactions made over the given time period. Indeed, this operating characteristic, depending on each specific case, is more representative of the activity of the electronic payment terminal than of the number of transactions.

Other operating characteristics can also be used depending on other embodiments of the disclosure, inasmuch they can be used to respond to the same problem consisting in observing the "habitual" activity of an electronic payment terminal to detect a risk of replacement of this electronic payment terminal by a fraudulent electronic payment terminal.

Similarly, a combination of several operating characteristics can be used so as to optimize the performance of the method of detection according to the different embodiments of the disclosure, while minimizing false alerts.

6.4. Other Characteristics and Advantages

Figure 3:
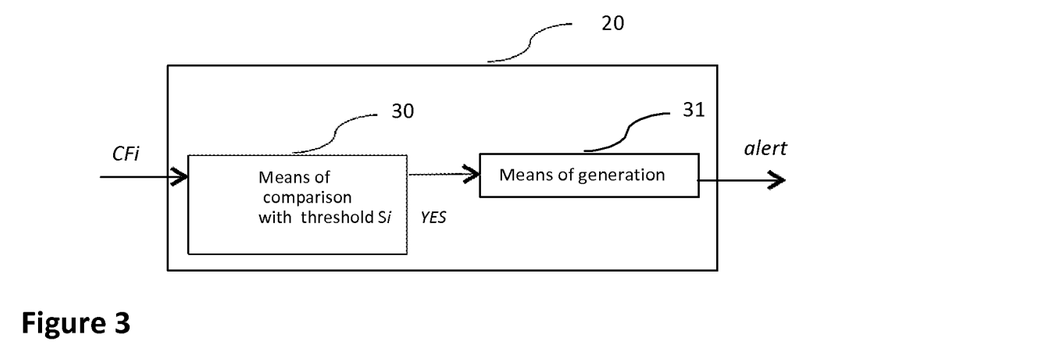
FIGS. 3 and 4 represent two examples of a device for detection according to the proposed technique in one particular embodiment.
Figure 4:
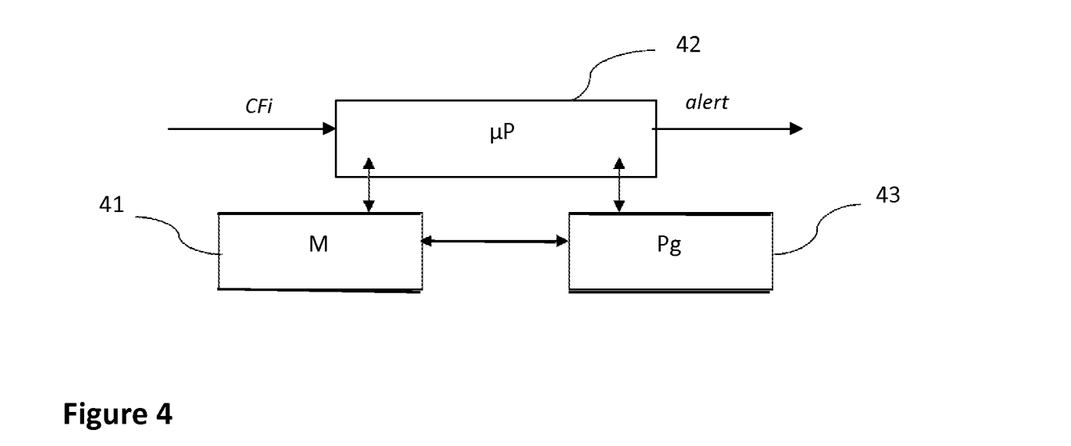

Referring to FIGS. 3 and 4, we now describe an example of a device for detecting a risk of replacement of an authentic electronic payment terminal by a fraudulent electronic payment terminal comprising means for executing the method described above.

Thus, as illustrated in FIG. 3, a device 20 of this kind, for example a remote server as described here above with reference to FIG. 2, or again an entity of a sales point, comprises means 30 (for example in the form of one or more modules) for comparing an operating characteristic CFi of an electronic payment terminal with a predetermined threshold Si. The device 20 also comprises means 31 for generating (for example in the form of one or more modules) an alert when the means for comparing have delivered a positive result.

We now describe this device 20 with reference to FIG. 4.

For example, the device comprises a memory 41 constituted by a buffer memory, a processing unit 42, equipped for example with a microprocessor and driven by the computer program 43 implementing a method for detecting a risk of replacement At initialization, the code instructions of the computer program 43 are for example loaded into a memory and then executed by the processor of the processing unit 42. The processing unit 42 inputs for example an operating characteristic CFi associated with an electronic payment terminal. The microprocessor of the processing unit 42 implements the steps of the method for detecting a risk of replacement of an authentic electronic payment terminal by a fraudulent electronic payment terminal, according to the instructions of the computer program 43, to generate an alert.

To this end, in addition to the buffer memory 41, the device comprises means 30 for comparing an operating characteristic CFi of an authentic electronic payment terminal with a predetermined threshold Si for this electronic payment terminal and means 31 for generating an alert (for example in the form of one or more modules) when the means for comparing have delivered a positive result.

The invention claimed is:

1. A method for detecting, by an electronic device, whether an authentic electronic payment terminal of a merchant user may have been replaced by a fraudulent terminal, the method comprising the following acts performed by the electronic device:
   obtaining, by the electronic device, at least one piece of information coming from and associated to said authentic electronic payment terminal, the authentic payment terminal being attached to a sales point of the merchant user;
   determining, by the electronic device, from said at least one piece of information at least one operating characteristic comprising at least one of a number of transactions during a predetermined time period, or a totalized transaction amount corresponding to transactions made during the predetermined time period; and
   comparing, by the electronic device, said at least one determined operating characteristic with at least one predetermined threshold for said authentic electronic payment terminal and associated by the electronic device geographically with the sales point to which the authentic payment terminal is attached;
   when a value of the at least one operating characteristic associated with said authentic electronic payment terminal during the predetermined period of time is below said at least one predetermined threshold:
      generating, by the electronic device, an alert that the authentic electronic payment terminal may have been replaced by a fraudulent terminal; and
      transmitting, by the electronic device, said generated alert addressed to at least one entity preliminarily associated by the electronic device with the merchant user of said authentic electronic payment terminal.

2. The method according to claim 1, further comprising:
   the electronic device obtaining said at least one piece of data from the merchant user of said authentic electronic payment terminal; and
   wherein generating an alert takes account of the at least one piece of data provided by the merchant user of said authentic electronic payment terminal.

3. The method according to claim 2, wherein said piece of data provided by said merchant user belongs to the group consisting of:
   the at least one time period;
   a minimum number of transactions made in relation with the at least one time period;
   a totalized minimum transaction amount corresponding to transactions made in relation with the at least one time period;
   a combination of said above data.

4. The method according to claim 1, wherein said at least one operating characteristic is associated with said authentic electronic payment terminal via a single identifier of said authentic electronic payment terminal.

5. The method according to claim 1, wherein the method is implemented by the electronic device remotely from the authentic electronic payment terminal.

6. The method according to claim 1, wherein, prior to said generating an alert, the comparing comprises:
   comparing, by the electronic device, said at least one determined operating characteristic of the authentic electronic payment terminal with the at least one predetermined threshold; and
   comparing, by the electronic device, an operating characteristic that is geographically associated with the sales point with the at least one predetermined threshold.

7. An electronic device for detecting whether an authentic electronic payment terminal of a merchant user may have been replaced by a fraudulent terminal, the electronic device comprising:
   a non-transitory computer-readable memory comprising program code instructions stored thereon; and
   a processor connected to the memory, which is configured by the program code instructions to perform acts of:
      obtaining at least one piece of information coming from and associated to said authentic electronic payment terminal, the authentic payment terminal being attached to a sales point of the merchant user;
      determining from said at least one piece of information at least one operating characteristic comprising at least one of a number of transactions during a predetermined time period, or a totalized transaction amount corresponding to transactions made during the predetermined time period; and
      comparing said at least one determined operating characteristic with at least one predetermined threshold for said authentic electronic payment terminal and associated by the electronic device geographically with the sales point to which the authentic payment terminal is attached;
      when a value of the at least one operating characteristic associated with said authentic electronic payment terminal during the predetermined period of time is below at least one predetermined threshold:
         generating, by the electronic device, an alert that the authentic electronic payment terminal may have been replaced by a fraudulent terminal; and
         transmitting, by the electronic device, said generated alert addressed to at least one entity preliminarily associated by the electronic device with the merchant user of said authentic electronic payment terminal.

8. A computer-readable recording medium on which there is recorded a computer program comprising a set of instructions executable by a computer or a processor of an electronic device to implement a method for detecting by the electronic device, whether an authentic electronic payment terminal of a merchant user may have been replaced by a fraudulent terminal, the method comprising:
- obtaining, by the electronic device, at least one piece of information coming from and associated to said authentic electronic payment terminal, the authentic payment terminal being attached to a sales point of the merchant user;
- determining, by the electronic device, from said at least one piece of information at least one operating characteristic comprising at least one of a number of transactions during a predetermined time period, or a totalized transaction amount corresponding to transactions made during the predetermined time period; and
- comparing, by the electronic device, said at least one determined operating characteristic with at least one predetermined threshold for said authentic electronic payment terminal and associated by the electronic device geographically with the sales point to which the authentic payment terminal is attached;
- when a value of the at least one operating characteristic associated with said authentic electronic payment terminal during the predetermined period of time is below at least one predetermined threshold:
  - generating, by the electronic device, an alert that the authentic electronic payment terminal may have been replaced by a fraudulent terminal; and
  - transmitting, by the electronic device, said generated alert addressed to at least one entity preliminarily associated by the electronic device with the merchant user of said authentic electronic payment terminal.

* * * * *